(12) United States Patent
Vairavan et al.

(10) Patent No.: US 10,354,212 B2
(45) Date of Patent: Jul. 16, 2019

(54) TECHNIQUES FOR BUSINESS PROCESS DRIVEN SERVICE ORIENTED ARCHITECTURE (SOA) GOVERNANCE

(71) Applicant: Software AG, Darmstadt (DE)

(72) Inventors: Shanmugam Vairavan, Chennai (IN);
Karthik Shanmugasundaram, Ambasamudram (IN); Gary Woods, Seeheim (DE)

(73) Assignee: SOFTWARE AG, Darmstadt (DE)

( * ) Notice: Subject to any disclaimer, the term of this patent is extended or adjusted under 35 U.S.C. 154(b) by 873 days.

(21) Appl. No.: 13/762,128

(22) Filed: Feb. 7, 2013

(65) Prior Publication Data

US 2014/0222523 A1    Aug. 7, 2014

(51) Int. Cl.
*G06Q 10/06* (2012.01)

(52) U.S. Cl.
CPC .................. *G06Q 10/0637* (2013.01)

(58) Field of Classification Search
CPC ...... G06F 8/10; G06F 17/30516; G06F 9/546; G06Q 10/06
USPC .......... 717/104; 707/802, E17.017; 705/7.11
See application file for complete search history.

(56) References Cited

U.S. PATENT DOCUMENTS

| | | | |
|---|---|---|---|
| 8,136,122 B2 | 3/2012 | Holar et al. | |
| 8,140,454 B2 | 3/2012 | Bullen et al. | |
| 8,140,615 B2 | 3/2012 | Miller et al. | |
| 8,266,351 B2 | 9/2012 | Schöning | |
| 8,301,687 B2 | 10/2012 | Rokicki et al. | |
| 2009/0281996 A1* | 11/2009 | Liu | G06F 8/10 |
| 2010/0095266 A1* | 4/2010 | Novak | G06F 8/71 717/101 |
| 2010/0125618 A1* | 5/2010 | Dutta | G06F 8/10 707/822 |
| 2010/0153167 A1* | 6/2010 | Kretzschmar | G06Q 10/00 715/229 |
| 2011/0004446 A1* | 1/2011 | Dorn | G01D 4/002 702/188 |
| 2012/0166421 A1 | 6/2012 | Cammert et al. | |
| 2012/0166688 A1* | 6/2012 | Schoning et al. | 710/62 |

OTHER PUBLICATIONS

Pierre de Leusse et al. A governance model for SOA, 2009 IEEE International Conference on Web Services, 2009 IEEE.*

* cited by examiner

*Primary Examiner* — Christine M Behncke
*Assistant Examiner* — Matthew H Divelbiss
(74) *Attorney, Agent, or Firm* — Nixon & Vanderhye P.C.

(57) ABSTRACT

Certain example embodiments tie the business process governance and Service Oriented Architecture (SOA) governance processes together through the use of Business Process Model and Notation (BPMN) and Event Driven Architecture (EDA) based messaging. That is, in certain example embodiments, a BPMN agent integrated into a SOA registry and publish/subscribe agents deployed to the SOA registry and a business process engine are used to bring the business and SOA governances together through an EDA that helps generate relevant messages from a BPMN model representing the various governance mechanisms. Advantageously, a Complex Event Processing (CEP) engine and business analytics modules may provide monitoring and feedback to both parts of the overall architecture.

26 Claims, 4 Drawing Sheets

TECHNIQUES FOR BUSINESS PROCESS DRIVEN SERVICE ORIENTED ARCHITECTURE (SOA) GOVERNANCE

FIELD OF THE INVENTION

Certain example embodiments described herein relate to systems and/or methods that are driven by business processes to enforce governance functions (e.g., lifecycle management, approval, policies, etc.) in a Service Oriented Architecture (SOA) registry. More particularly, certain example embodiments described herein relate to the incorporation of a Business Process Model and Notation (BPMN) agent into a SOA registry, e.g., so that governance-related mechanisms that are represented using a BPMN model can be used to generate BPMN messages that are published and subscribed to, in order to provide a combined view of the business process execution and the governance process execution.

BACKGROUND AND SUMMARY OF EXAMPLE EMBODIMENTS OF THE INVENTION

As is known, a Business Process Model and Notation (BPMN) is a graphical representation for specifying business processes in a business process model. In some scenarios, a BPMN can be serialized to a format such as XML Process Definition Language (XPDL) and/or other formats.

Service Oriented Architecture (SOA) implementations oftentimes include SOA entities such as web services, REST services, business processes, servers, and various other applications. In addition, a SOA registry oftentimes plays a central role in both storing metadata associated with the SOA entities, and governing the design-time and/or run-time lifecycle of the SOA entities using policies, lifecycle management, approval management, and/or other governance mechanisms.

The governance mechanisms used for different types of SOA entities can be different. In fact, the governance mechanisms may be different for even the same type SOA entities, e.g., within the same or different departments of a given organization. Furthermore, the governance mechanisms associated with a business process entity might require the governance of all or a partial subset of the SOA entities (e.g., the web services, REST services, etc.) involved in that process. And in such cases, the governance mechanism of the business process might additionally or alternatively include other governance processes of SOA entities included in the business processes. Moreover, there could be lot of operational processes in the organization. Review processes typically are used to help avoid uncontrolled growth of the process model, and these review processes also are a form of governance.

It should be apparent, then, that management of the governance processes becomes important. Unfortunately, however, the management of the governance processes of the SOA entities and business processes is too complex to be performed manually. For example, when the size of the organization increases, the number and complexity of the associated processes also tend to increase. Similar observations may apply as companies merge with one another, when a single company revamps its internal structures and/or ways of doing business, as new technologies are developed and implemented over time, etc. In a nutshell, the pure number of stakeholders, stakeholder responsibilities, iterations, technology and/or other changes, etc., can make effectively enforcing rules and policies an enormous challenge.

Thus, it will be appreciated by those skilled in the art that it would be desirable to provide techniques for managing governance processes in connection with SOA environments, even in situations where the underlying business processes, SOA entities, and/or other elements are susceptible to change.

One aspect of certain example embodiments relates to providing a business process driven SOA governance approach. For instance, certain example embodiments help automate governance processes by integrating such processes with a SOA registry and a business process engine (BPE), e.g., to reduce complexities and/or risks associated with these elements and the ways that they may change over time.

Another aspect of certain example embodiments relates to representing governance processes as process models using a standardized notation such as, for example, BPMN.

Still another aspect of certain example embodiments relates to a BPMN agent integrated into a SOA registry and publish/subscribe agents deployed to the SOA registry and a business process engine, that are used to bring the business and SOA governances together through an Event Driven Architecture (EDA) that helps generate relevant messages from a BPMN model representing the various governance mechanisms. Advantageously, a Complex Event Processing (CEP) engine and business analytics modules may provide monitoring and feedback to both parts of the overall architecture.

In certain example embodiments, a joint SOA and business process governance computer system is provided. A BPE comprising processing resources including at least one processor and a memory is configured to coordinate execution of, and govern, a predefined computer-modeled business process. The business process includes a plurality of SOA entities associated therewith. A SOA registry is configured to govern at least the SOA entities associated with the business process and also store metadata associated with the SOA entities. An agent is configured to: receive a document specifying governance-related mechanisms to be used in connection with the SOA entities and/or the business process, extract governance-related entities from the document, provide the extracted governance-related entities to the SOA registry, and cause the provided governance-related entities to become enabled in connection with the SOA registry. A SOA event emitter provided to the SOA registry is configured to publish SOA messages that can be subscribed to by a SOA event subscriber provided by the BPE. A process event emitter provided by the BPE is configured to publish process messages that can be subscribed to by a process event subscriber provided to the SOA registry. An analytics module is configured to receive and analyze SOA events from the SOA event emitter and process events from the process event emitter. The SOA registry is configured to enforce the governance-related mechanisms through the enabled governance-related entities.

According to certain example embodiments, a CEP engine may be configured to receive and analyze SOA events from the SOA event emitter, as well as process events from the process event emitter. In this regard, the analytics module and/or the CEP engine may be configured to provide further SOA events and further business process events to the SOA registry and/or BPE for processing thereon.

According to certain example embodiments, the document may be a BPMN model representing at least some governance mechanisms.

According to certain example embodiments, the agent may be further configured to extract governance-related entities and provide said governance-related entities to the SOA Registry.

In certain example embodiments, a computer system configured to help provide combined SOA and business process governance is provided. Processing resources include at least one processor and a memory. The processing resources are configured to cooperate in at least: receiving a document specifying governance-related mechanisms to be enforced on SOA entities stored in a SOA registry and/or a business process leveraging the SOA entities that is executable in connection with a BPE; extracting governance-related information from the document; creating at least one governance-related entity based on the extracted governance-related information (e.g., by optionally converting the extracted governance-related information into XML-based representations of governance-related entities); and deploying the at least one governance-related entity to the SOA registry, with each said deployed governance-related entity becoming active in enforcing the governance-related mechanisms. The governance mechanisms are policies, lifecycle management, and/or approval management type governance mechanisms, the processing resources being further configured to generate entities therefrom.

In certain example embodiments, a SOA system is provided. At least one processor and a memory are provided. A SOA registry is configured to govern at least SOA entities associated with a BPE and also store metadata associated with the SOA entities. An agent is configured to: receive a computer-based model specifying governance-related mechanisms to be used in connection with the SOA entities and/or the business process, extract governance-related entities from the document, publish the extracted governance-related entities to the SOA registry, and cause the published governance-related entities to become enabled in connection with the SOA registry. An EDA-based SOA event emitter is configured to publish SOA events that can be subscribed to by a SOA event subscriber provided by the BPE. A process event subscriber is configured to receive process events published by a process event emitter provided by the BPE. An enforcement module is configured to enforce the governance-related mechanisms through the enabled governance-related entities.

In certain example embodiments, a method of providing combined SOA and business process governance is provided. A BPMN model file specifying governance-related mechanisms to be enforced on (a) SOA entities stored in a SOA registry and/or (b) a business process leveraging the SOA entities that is executable in connection with a BPE, is received. Governance-related information is extracted from the file. At least one governance-related entity is created based on the extracted governance-related information. Each said created governance-related entity is validated. Each said validated governance-related entity is published, in connection with at least one processor, to the SOA registry, with the at least one published governance-related entity becoming active in enforcing the governance-related mechanisms. The governance mechanisms are policies, lifecycle management, and/or approval management type governance mechanisms.

In certain example embodiments, a method of providing combined SOA and business process governance in connection with a SOA registry and a BPE that cooperate to enable execution of a computer-modeled business process. Governance-related entities that are published in accordance with the described in the paragraph above are activated in connection with at least one processor. SOA messages that can be subscribed to by a SOA event subscriber provided to the BPE are published via an EDA-based SOA event emitter. Process messages published by a process event emitter provided to the BPE are received via a process event subscriber. Governance-related mechanisms are enforced through the activated governance-related entities and also in association with SOA and/or process events.

In certain example embodiments, non-transitory computer readable storage mediums may be provided that tangibly store instructions that, when executed by a processor of a suitably configured computer system, may perform these and/or other related methods.

These aspects and example embodiments may be used separately and/or applied in various combinations to achieve yet further embodiments of this invention.

BRIEF DESCRIPTION OF THE DRAWINGS

These and other features and advantages may be better and more completely understood by reference to the following detailed description of exemplary illustrative embodiments in conjunction with the drawings, of which.

DETAILED DESCRIPTION OF EXAMPLE EMBODIMENTS OF THE INVENTION

In certain example embodiments, business process driven governance is integrated with a Service Oriented Architecture (SOA) registry and business process engine (BPE). The governance processes may, for example, be modeled using a standardized notation such as Business Process Model and Notation (BPMN) or the like. As will be explained in greater detail below, a governance process may in some scenarios be modeled as a sub-process of a larger process model described in the standardized notation.

Certain example embodiments therefore relate to the implementation of an agent in a SOA registry to help extract governance processes from a given model. In certain example scenarios, this may involve the provision of a BPMN agent in a SOA registry for extracting the governance processes from the given BPMN model. Once the governance process related information is extracted, the BPMN agent may define and enable the corresponding governance of SOA entities in SOA registry. The execution of these governance processes in the SOA registry may be integrated with the business process execution in the BPE. The communication between the SOA registry and the BPE can be implemented using Event Driven Architecture (EDA), for example, based events communicated in connection with the publish-subscribe or other appropriate model.

Figure 1:
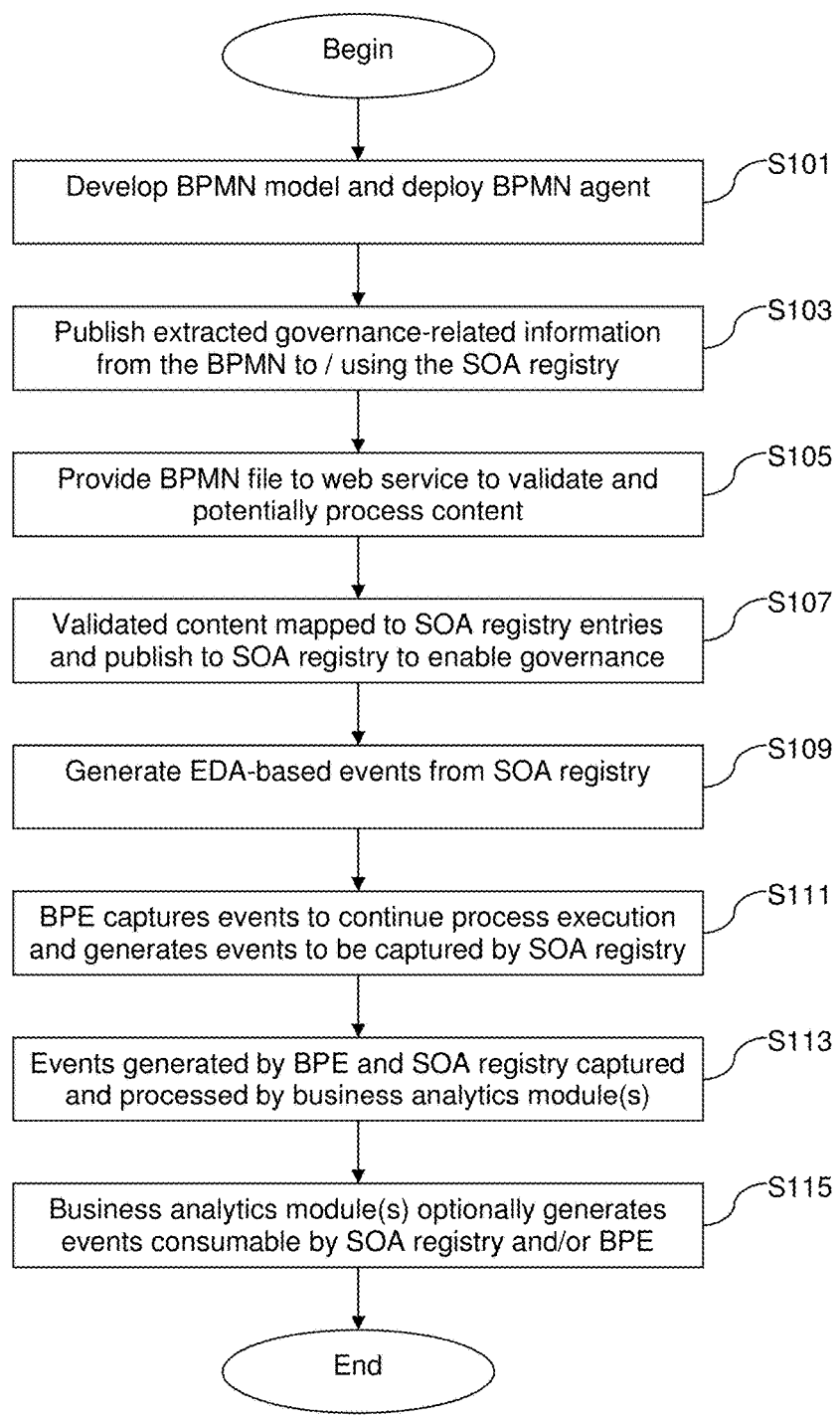
FIG. 1 is a flowchart providing an overview of techniques for business process driven Service Oriented Architecture (SOA) governance, in accordance with certain example embodiments.

FIG. 1 is a flowchart providing an overview of techniques for business process driven SOA governance, in accordance with certain example embodiments. In step S101, a BPMN model representing the governance-related mechanisms is developed and an application (sometimes referred to herein as the agent or BPMN agent) that extracts governance-related information from the BPMN model is deployed. The application may in certain example embodiments be implemented as a Web Service deployed in the SOA registry. In certain example embodiments, the WSDL of the Web Service may be exposed to the consumer using the SOA registry.

The deployed BPMN agent publishes the corresponding extracted entities in a BPMN document, file, or other appropriate message, in connection with the SOA registry, in step S103. The BPMN file is provided as input to a web service in step S105. The web service looks at the BPMN contents and determines whether it has policies, lifecycle management, approval management, and/or other governance-related processes associated therewith. In certain example embodiments, the contents of the BPMN model may be validated against the policies, lifecycle management, approval management processes, and/or the like, to ensure compliance against the SOA registry that is provided with the BPMN agent. It is noted that a partial or total conversion of the BPMN model may be involved in this process.

If the extracted BPMN model portion(s) is/are not valid for or relevant to governance-related purposes, then the operation will not be continued, and an appropriate error message will be returned. On the other hand, in step S107, validated BPMN content (content having associated governance-related processes) is mapped to the SOA registry entities and published to the SOA registry, to enable governance in the SOA registry. For example, the governance processes may be created as policy entities, lifecycle management entities (e.g., lifecycle object, lifecycle state, lifecycle stage, etc.), approval management entities (approval work flow, policy, etc.), and/or the like, and may be published to the SOA registry that is configured with the BPMN agent. The published policies, lifecycle management, approval management, and/or other objects, thus may enable the enforcement of governance with respect to a subset of the objects in SOA registry. Corresponding EDA-based events are emitted from the SOA registry. For instance, during the governance process execution, in step S109, the SOA registry will emit EDA-based events based on the configuration, which may be EDA event emitter implementation specific in certain example embodiments. That is, when governance processes are executed in the SOA registry for a SOA entity, the SOA events may be emitted from the SOA registry using an EDA-based event emitter, based on this configuration. For example, the EDA-based SOA event can be represented using XML, and the events emitted from the SOA registry can be filtered based on the configuration.

As alluded to above, event configuration for an event emitter and event subscriber may be implementation specific in certain example embodiments. For instance, the event configuration can be provided via an XML document that is given as an input for the event emitter and event subscriber, e.g., during the start-up of the application in which it is deployed (which could be the SOA Registry, Business Process Engine, CEP engine, Business Analytics module, etc., as described herein). An example XML configuration file is provided in the attached Appendix. Such an event configuration file may include one of the EventEmitter element or EventSubscriber element, or both.

There could, for example, be a maximum of one EventEmitter element, e.g., containing one Emitter_Endpoint sub element. The event subscribers could then subscribe to this endpoint. The EventEmtter may contain the optional filter element (noted above) that can be used to specify the type of events that need be emitted when the events occur on the specified object types. If no ObjectType is specified, then all object types can be taken into account by default. Similarly, if no event type is specified, then all of the event types may be taken in to account by default.

An Event Subscriber may listen from more than one endpoint. Therefore, the EventSubscriber element may have more than one subscribe sub-element. Each subscribe element may be configured to listen from more than one endpoint. The EventSubscriber may include, for example, the optional filter element that is used to specify the type of events that are emitted when the events occur on the specified object types. If no object type is specified, then it may listen to events generated for all the object types by default. If no event type is specified, then it may listen to all types of events by default.

As shown in step S111, the BPE in which the business process is running can capture events to continue the process execution, and it also can generate events that can be captured by the SOA registry. For example, a subscriber agent in the BPE may be defined to receive the SOA events from SOA registry, and the BPE also may be configured to emit events that are subscribed to by the SOA registry, potentially enabling the governance processes to continue. For instance, when a business process starts execution in the BPE, an event could be generated. The SOA registry may capture that event and verify that the process is already approved to be in production (e.g., execution of the process in business process engine deployed in the production environment). The result of the verification may be generated as an event from the SOA registry. This event may be captured by the business process engine, and it can then proceed or stop, based on the event.

During and/or after this, the events generated from the BPE and the SOA registry may be captured by one or more business analytics modules for further processing and monitoring purposes in step S113. Complex Event Processing (CEP) and/or other techniques can be implemented for such purposes. For instance, in the example above, verification failures can be captured by the CEP engine, and it can raise an alarm if appropriate.

It will be appreciated that the processing of these events may in some situations lead to the generation of other events that can be consumed by the SOA registry and/or the BPE, as indicated in step S115. That is, the SOA registry event subscriber and/or business process engine event subscriber can receive the events that are emitted from a CEP engine or the like, e.g., for continuance of the process in SOA registry and/or business process engine.

Example Implementation

Figure 2:
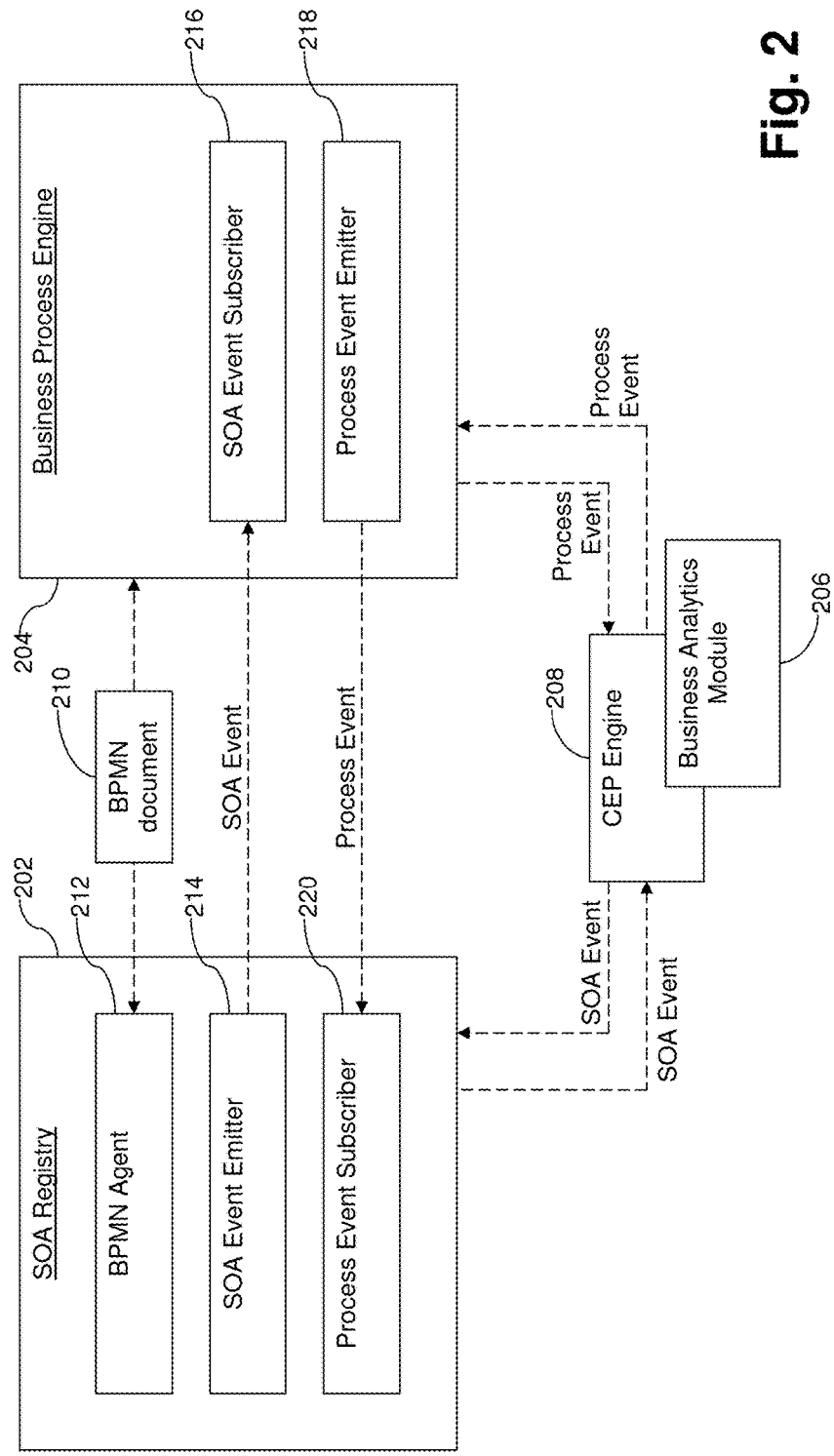
FIG. 2 is a block diagram schematically illustrating an environment for business process driven SOA governance, in accordance with certain example embodiments.

FIG. 2 is a block diagram schematically illustrating an environment for business process driven SOA governance, in accordance with certain example embodiments. Although a single registry 202, business process engine 204, business analytics module 206, and CEP engine 208 are shown in the FIG. 2 example SOA environment, it will be appreciated that one or more of these and/or other elements may be provided in different example embodiments. It also will be appreciated that these one or more different elements may be connected to one another in any suitable relationship. For example, a single SOA registry may be in communication with multiple BPEs, a single CEP engine may process process events from one or more BPEs and/or process SOA events from one or more SOA registries, etc.

As shown in FIG. 2, a BPMN document 210 is provided as input to the BPMN agent 212 for processing. In this regard, the BPMN agent 212 may be a software application or web service and run in connection with locally provided, shared, and/or remote processing resources (which may comprise at least one processor and a memory). For example, the BPMN agent 212 may use processing resources provided to the SOA registry 202. In any event, the BPMN agent 212 validates the document 210 and extracts governance processes therefrom. It publishes the extracted governance related entities to the SOA registry 202, where they may be persisted in a non-transitory computer readable medium or the like. Once the governance entities are published in SOA registry 202, the corresponding governance process may be automatically enabled by and/or in the SOA registry 202 (e.g., in connection with the processing resources of the SOA registry 202).

The SOA registry 202 has an EDA-based SOA event emitter 214. The SOA event emitter 214 emits events based on the configuration during the execution of governance processes in the SOA registry 202. The BPE 204 can subscribe to these events, e.g., in connection with a SOA event subscriber 216. The BPE 204 continues the execution of corresponding processes using the events received by the SOA event subscriber 216. In much the same way, the BPE 204 emits process events during the process execution in connection with a process event emitter 218. These events can be subscribed in the SOA registry 202, e.g., using a process event subscriber 220, and the governance processes may use these events to trigger the corresponding steps in SOA registry 202.

The events generated from the SOA registry 202 and BPE 204 can be subscribed to by the business analytics module 206 and/or the CEP engine 208. These events, when considered together, may be thought of as providing a combined view of the business process execution and the governance process execution. Such information can be used for further processing and monitoring purposes. In this regard, the SOA registry event subscriber 220 and/or the business process engine event subscriber 216 may receive events emitted from the CEP engine 208, e.g., for further continuance of the process in SOA registry 202 and/or the business process engine 204. The combined view might be useful for, for example, generating key performance indicators (KPIs) and linking small or large deviations therein to one or more specific processes or sub-processes, etc. In some scenarios, the combined view may help in determining the process execution steps. For example, a governance process can be a sub-process of a bigger business process. In this case, the combined view may help monitoring the process execution in SOA registry. In the same case, the process continuity (e.g., from BPE to SOA registry, and after the sub-process execution, the SOA registry to BPE) can be captured.

It will be appreciated from the above that, although not expressly shown in FIG. 2, one or both of the business analytics module 206 and the CEP engine 208 may subscribe to events from, and/or publish events to, either or both of the SOA registry 202 and the BPE 204. It also will be appreciated from the above that, although not expressly shown in FIG. 2, the SOA registry 202, the BPE 204, the business analytics module 206, and the CEP engine 208 may have their own processing resources, and/or have access to shared processing resources.

Figure 3:
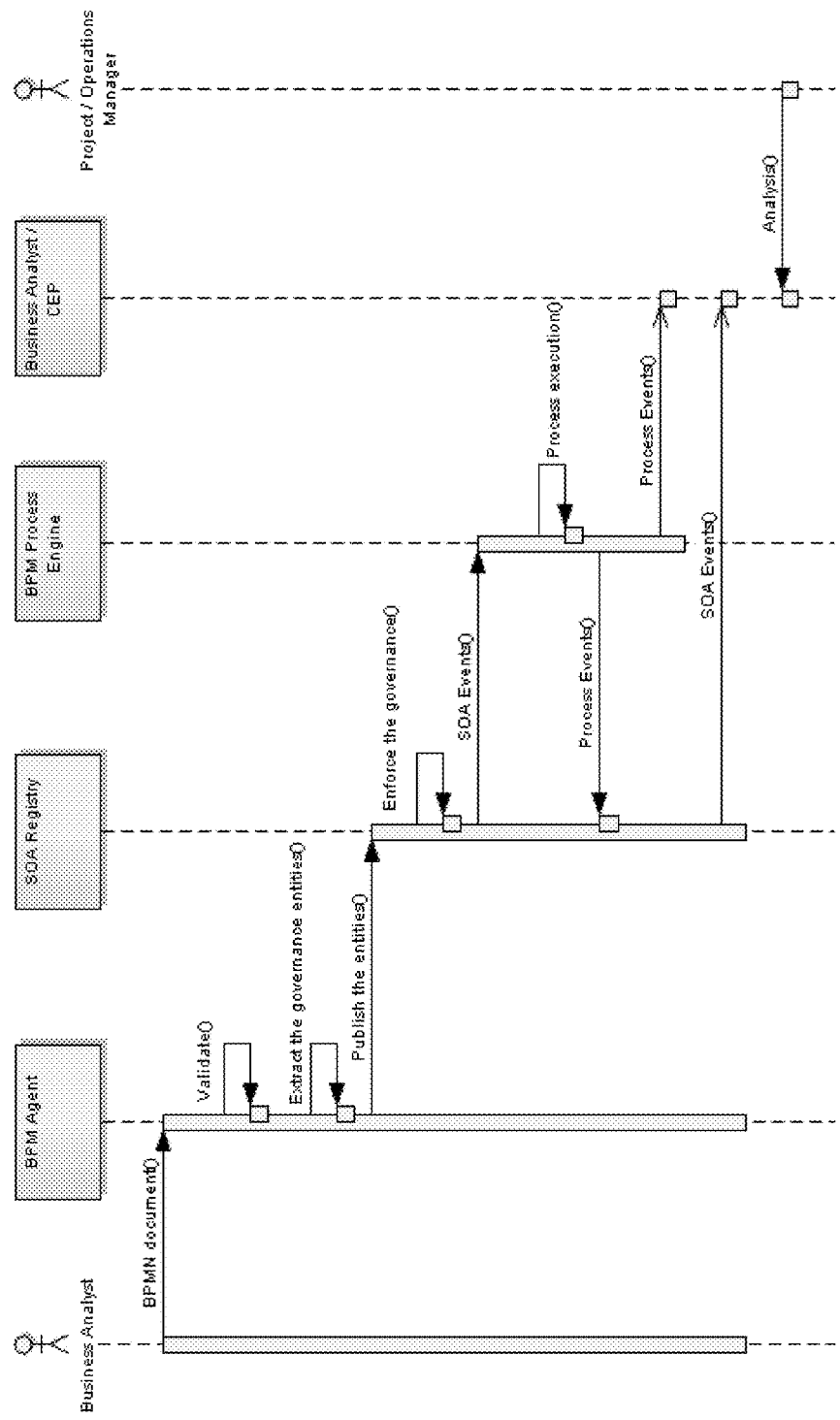
FIG. 3 is a sequence diagram providing further detail on how the FIG. 1 example process can be used with the FIG. 2 example system, in accordance with certain example embodiments.
Figure 4:
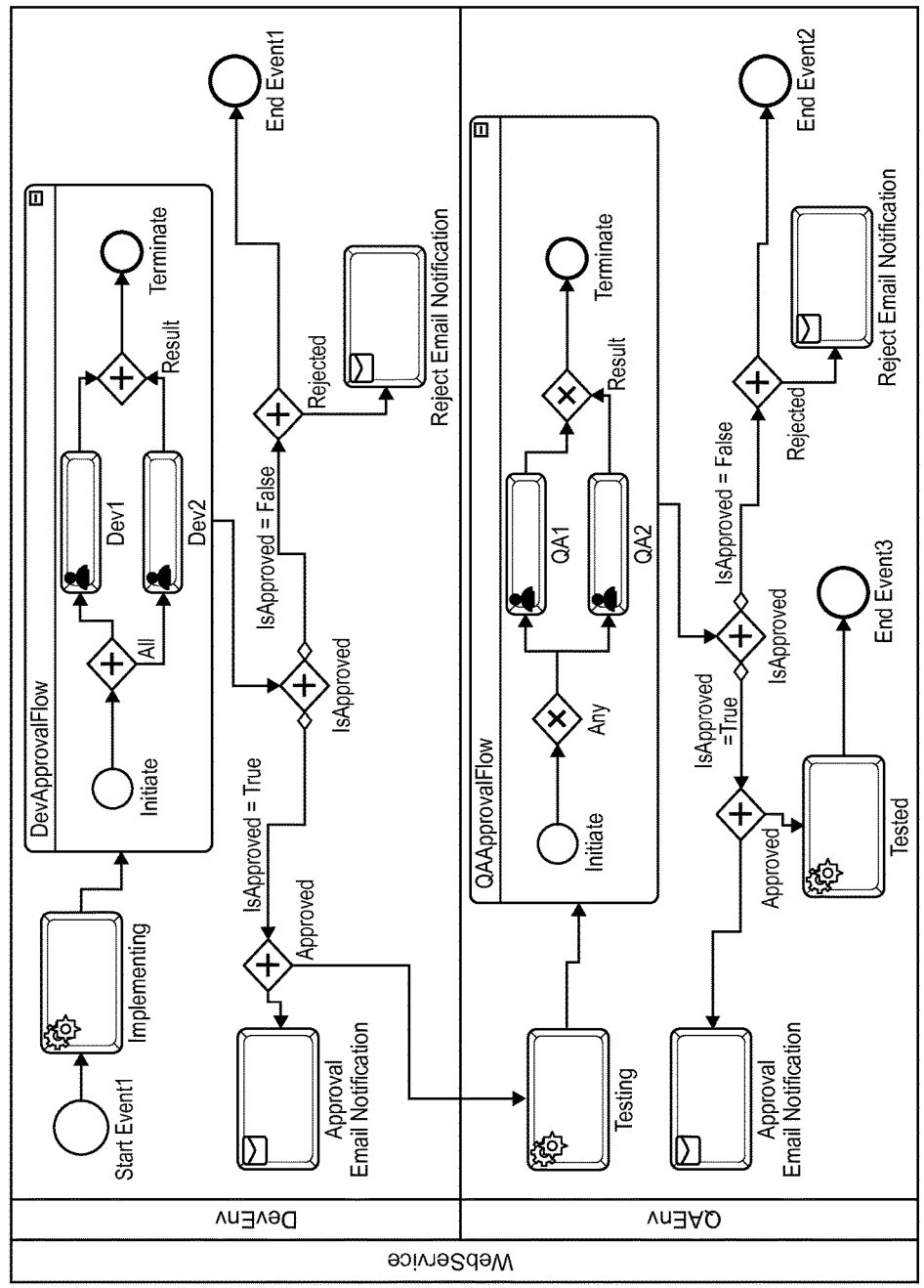
FIG. 4 is a BPMN model diagram that illustrates a typical lifecycle management and approval management policy for a "Web Service" object type in accordance with an example governance mechanism implementation.

FIG. 3 is a sequence diagram illustrating the example steps described above. The first step shown in FIG. 3 involves providing a defined BPMN model document as input to the BPMN agent. In this regard, FIG. 4 is a BPMN model diagram that illustrates a typical lifecycle management and approval management policy for a "Web Service" object type in accordance with an example governance mechanism implementation. Of course, it will be appreciated that the FIG. 4 BPMN model is only one example of a lifecycle management and approval management policy and that many other models for these and/or other governance mechanisms can be used in place of, or in addition to, this specific example.

The BPMN document is validated, and this may in certain example embodiments involve the conversion of the BPMN document to an XML-based or other representation. That is, in certain example embodiments, the XML-based or other representation can be validated following the conversion. In certain example embodiments, the inability to generate the XML or other representation may by itself in some ways represent a validation of the content.

The BPMN documents may be represented in XPDL in certain example embodiments. In this regard, Table 1 provides descriptions of example XPDL elements that may be used in connection with certain example implementations. Of course, the XPDL elements listed in Table 1 are illustrative, and the present invention should not be viewed as being limited to XPDL in general, the example XPDL elements in Table 1, or the precise descriptions of such XPDL elements in Table 1.

TABLE 1

| XPDL Element | Description |
| --- | --- |
| <Pool><br>  <anyAttribute<br>namespace="{ext.soa.object.type.id}"><br>uddi:<br>c90df7ef-7a9c-423b-a4f8-bf9e74724819,<br>uddi:<br>de3ab4d6-dc84-41d5-9945-73641e7f4cea</<br>anyAttribute ><br></Pool> | SOA object types may enforce lifecycle management and/or approval management. The unique identifiers of the SOA object types can be added in an anyAttribute element of a Pool. |
| <Activity><TaskApplication/></Activity> | A lifecycle model definition may be provided for the selected SOA object types. Each lifecycle state of the lifecycle model can be represented in a TaskApplication element. |
| <Activity><TaskUser/></Activity> | At the least one user or user group may be specified for executing the transition of the SOA object types from one lifecycle state to the next and/or for triggering the approval flow. The user or user group information can be represented in the TaskUser element. |
| <Activity> <Route GatewayType="Parallel"/></Activity><br><Activity> <Route GatewayType="Exclusive"/></Activity> | An approval flow type (e.g., "Any" or "All") may be specified. If the approval flow is of type 'Any', the transition of the SOA object types from one state to the next can be approved by any one of the approvers for the transition to manifest. If the approval flow is of type 'All', the transition of the SOA object types from one state |

TABLE 1-continued

| XPDL Element | Description |
|---|---|
| | to the next should be approved by all the approvers for the transition to manifest. The approval flow type can be specified using the Route element. |

The validation specified in the Table 1 example may be performed in certain example embodiments. In this regard, the validation of the XPDL can be performed by invoking the example web service operation "processEnforcer" detailed below:

```
<wsdl:message name="processEnforcerRequest">
    <wsdl:part name="xpdlFileUrl" type="xsd:string"/>
    <wsdl:part name="soaRegistryUrl" type="xsd:string"/>
</wsdl:message>
<wsdl:operation name="processEnforcer">
    <wsdlsoap:operation soapAction=""/>
    <wsdl:input name="processEnforcerRequest">
        <wsdlsoap:body
            encodingStyle=http://schemas.xmlsoap.org/soap/encoding/
            namespace="http://DefaultNamespace" use="encoded"/>
    </wsdl:input>
    <wsdl:output name="processEnforcerResponse">
        <wsdlsoap:body
            encodingStyle="http://schemas.xmlsoap.org/soap/encoding/"
            namespace="http://localhost:6067/axis/SOAApprovalService.jws"
            use="encoded"/>
    </wsdl:output>
</wsdl:operation>
```

Custom validations may be added for the BPMN content in certain example embodiments. A property with the key "BPMN.Validator.Implementation" for example may be used to add a validation implementation in certain example embodiments. The interface to which a custom validation can be implemented is mentioned in the code snippet example provided below. In this example, the validation error would be returned to the web service as error response.

```
/**
 * The class implementing the I/F may be used for BPMN validation
 */
public interface BPMNValidator {
    /**
     *
     * @param content, InputStream of BPMN content to be validated
     * @return
     */
    public String validate(InputStream content)
        throws ValidationException;
}
```

The following description provides one illustrative approach for converting the FIG. 4 example BPMN model to an example XPDL xml. Reference also is made to the Table 1 mapping above. The type of objects in which the governance process will be executed can be identified via the package definition. The corresponding XPDL element may resemble the following:

```
<Package>
    <anyAttribute namespace=" {ext.soa.object.type.id}">uddi:c90df7ef-
    7a9c-423b-a4f8-bf9e74724819</anyAttribute>
</ Package>
```

Here, anyAttribute is used to store the object types involved in the SOA process execution, and it is added as a property in the process notation of the BPMN. In certain example embodiments, the process notation can use a custom property "ext.soa.object.type.id" to represent the object type id as a namespace.

In the FIG. 4 example, the approval management governance process is defined using the Activity element that has the "BlockActivity" element and the "Route Gateway Type" element enabled:

```
<Activity Name="DevApprovalFlow">
    <BlockActivity>
        ...
        ...
        <Route GatewayType=" Exclusive"/>
    </BlockActivity>
</Activity>
```

Here, the "DevApprovalFlow" sub-process describes the approval process flow. If the Gateway attribute value of the "Route" element is "Parallel" inside an Activity (Sub-Process), then the approval has to be done by all the defined participants in the approval.

In the FIG. 4 example, the approval participant is defined using the "Performer" element of an "Activity". The "Performer" element is used to map the unique identifier of a SOA registry user or "group of users". The corresponding XPDL element therefore may correspond to the following:

```
<Activity Name="Dev1">
    <Performer>c5e539a9-b0d2-45c3-bde1-62babc1c6771</Performer>
</Activity>
```

In the FIG. 4 example, the lifecycle states are represented via "Activity" elements of type "TaskApplication". The Corresponding XPDL element therefore may correspond to the following:

```
<Activity Name="Testing">
    <TaskApplication>
    <Activity>
```

In the FIG. 4 example, the lifecycle stage is represented via the Pool element. The corresponding XPDL element therefore may correspond to the following:

```
<Pool Name ="DevEnv">
</Pool>
```

The lifecycle states and stages are grouped via the "Transition" element, which in this example describes the flow in which the lifecycle state and stages are executed in the described order using the "From" and "To" attributes. Multiple values of the "To" attribute are separated using a ",".

In the FIG. 4 example, the Policy action is represented via the "Activity" element with the property "anyAttribute" type "ext.soa.is Policy" set to true. For example, an Email Notification Policy action may be represented in XPDL in accordance with the following:

```
<Activity Name="Approval Email Notification">
  < TaskSend>
  ...
</TaskSend>
<anyAttribute namespace="{ext.soa.isPolicy}"> true</ anyAttribute>
</Activity>
```

Referring once again to FIG. 3, the next step involves extracting the governance process related content from the XPDL (or other BPMN representation) and creating SOA registry specific governance entities. In certain example embodiments, the coupling between the BPMN agent and the SOA registry can be managed at least in part by an implementation of the JAXR (JAVA API for XML Registry) specification, although other technologies can be used in other example embodiments. Certain example embodiments may provide a default transformation. Table 2 illustrates some of the XPDL elements that can be mapped to the policy management, lifecycle management, and/or approval management SOA objects. Of course, other mappings are possible in connection with different example embodiments.

TABLE 2

| XPDL Element | Description |
| --- | --- |
| `<Package> <anyAttribute namespace="{ext.soa.object.type.id}"> uddi:c90df7ef-7a9c-423b-a4f8-bj9e74724819, uddi:de3ab4d6-dc84-41d5-9945-73641e7f4cea</ anyAttribute > </Package>` | The Package element can be used to specify the SOA object types that are involved in the lifecycle management and/or approval management process. |
| `<Activity><TaskApplication/></Activity>` | The TaskApplication element of the Activity element can be used to define the lifecycle state of an object type. |
| `<Activity><BlockActivity/></Activity>` | The BlockActivity element can be used to represent the approval flow. |
| `<Lane><anyAttribute namespace="{ext.soa.lcm.stage.id}"> uddi:591df7ef-6a9c-423b-a4f8-bf9e74724819, </ anyAttribute > </Lane>` | In a preferred embodiment, the Lane element can be used to specify the lifecycle stage property. |
| `<Activity><Route GatewayType="Parallel"/></Activity>` | If the GatewayType attribute value of the Route element is "Parallel" inside an Approval Flow (Sub-Process), then the Approval Flow is of type ALL. |
| `<Activity><Route GatewayType="Exclusive "/></Activity>` | If the GatewayType attribute value of the Route element is "Exclusive" inside an Approval Flow (Sub-Process), then the Approval Flow is of type ANY. |
| `<Activity><TaskUser/></Activity>` | The TaskUser element can be used to represent the users and user group that are involved in the Approval Flow. |
| `<Performer>c5e539a9-b0d2-45c3-bde1-62babc1c6771</Performer>` | The Performer element can be used to map the unique identifier of SOA registry user or user group. |
| `<Activity><TaskSend></Activity >` | The TaskSend element can be used to populate the email notification message during approval and rejection action. |
| `<Activity><anyAttribute namespace="{ext.soa.isPolicy}"> true </Activity>` | The Activity with anyAttribute namespace element of type "ext.soa.isPolicy" can be used to represent the policy action instance. |

Certain example embodiments may enable custom adaptors to be added for the transformation. In this regard, in certain example embodiments, the property with the key "BPMN.Transformer.Implementation" may be used to configure the custom transformation implementation provided by the "BPMNTransformer" interface. The "transform" method may return a collection of registry objects. The populated registry object can be persisted in the SOA registry (e.g., in a non-transitory computer readable storage location), e.g., via the "publish" method. After successful persistence, the XPDL document may be stored as a business process object and may be associated with policy, lifecycle, approval, and/or other management objects. The following code snippet is an example implementation of the BPMN-Transformer interface:

```
/**
 * The class that implements the interface would be used for BPMN
 * transformation. Transforming BPMN content to SOA objects, that
 * create policy, lifecycle, and/or approval management objects.
 *
 */
public interface BPMNTransformer {
    /**
     *
     * @param content
     * @return
     */
    public Collection<RegistryObject> transform(InputStream content)
        throws TransformException;
    public Collection<BulkResponse>
        publish(Collection<RegistryObject>) throws Exception;
}
```

Referring once again to FIG. 3, the published governance object enables the governance process in the SOA registry to be enforced. The governance process execution in the SOA registry can be integrated, using the EDA-based events, with the business process engine in which the business processes are executed. Therefore, during the execution of the governance, processes in SOA registry can emit events that can be subscribed to by the BPE to continue the business processes that are associated with the governance process in SOA registry. The governance events are emitted from the SOA registry using the EDA-enabled event emitter. The event emitter can filter the events from the SOA Registry using the configurations, e.g., as discussed herein.

In certain example embodiments, the event emitter implementation can be configurable. In that regard, the implementation may use the example interface "EventEmitter" described below, and the implementation class may be specified using a property "SOARegistry.Event.EventEmitter":

```
/**
 * The class that implements the interface emits the events from the
 * SOA Registry.
 *
 */
public interface EventEmitter {
    /**
     * Emits the events
```

```
    * @return
    */
   public void emit(Object object) throws Exception;
}
```

In certain example embodiments, a registry event can be described in accordance with the following example:

```
<Event>
  <Header>
    ...
    <EventType>{namspace}RegistryEvent</EventType>
    <Timestamp>1256953732</Timestamp>
    ...
  </Header>
  <Body>
    <RegistryEvent>
      ...
      <ProcessId>bfc62955-873b-9a26-78ed-bcfa9825d75d</ProcessId>
      <ObjectId>cfc65954-823b-4a66-88ed-aafa9815d7e4</ObjectId>
      ...
      <State>Analysis</StateChange>
      <Stage>Development</Stage>
      ...
      <Activity>
      ...
      </Activity>
      <Transition>
      ...
      </Transition>
    </RegistryEvent>
  </Body>
</Event>
```

When a business process is executed in the business process engine, process events can be generated therefrom. These events can be subscribed to by the SOA registry. The corresponding action in the SOA registry governance processes may be triggered based on the process events received. The following is an example process event:

```
<Event>
  <Header>
    ...
    <EventType>{namspace}ProcessEvent</EventType>
    <Timestamp>1256953734</Timestamp>
    ...
  </Header>
  <Body>
    <ProcessEvent>
      ...
      <ProcessId>bfc62955-873b-9a26-78ed-bcfa9825d75d</ProcessId>
      <Activity>
      ...
      </Activity>
      <Transition>
      ...
      </Transition>
    </ProcessEvent>
  </Body>
</Event>
```

In certain example embodiments, the event subscriber implementation can be configurable. The interface "EventSubscriber" may be implemented, and the implementation class may be specified using a property "SOARegistry.Event.EventSubscriber", e.g., in accordance with the following:

```
/**
 * The class that implements the interface receiving process events.
 *
 */
public interface EventEmitter {
  /**
   * Emits the events
   * @return
   */
  public void receiveEvent(Object object) throws Exception;
}
```

Referring once again to FIG. 3, the EDA-based events generated from the SOA registry and the business process engine can be subscribed to by the business analytics module and/or the CEP engine in certain example embodiments. The events may in some cases provide combined information of the business process execution and the governance process execution that can, for example, be used for further processing and monitoring purposes as indicated above.

Although certain example embodiments have been described in connection with a BPMN agent incorporated into a SOA registry, it will be appreciated that a BPMN or other model agent may be located in different places in different example embodiments. For example, a BPMN or other model agent may be provided within the BPE, external to both the SOA registry and BPE, etc.

Publish/subscribe and/or triggering systems/subsystems that may be used in connection with certain example embodiments are described in, for example, U.S. Pat. Nos. 8,136,122 and 8,301,687, the entire contents of which are hereby incorporated herein by reference.

Example CEP-related techniques are set forth in U.S. Pat. No. 8,266,351 and U.S. Publication No. 2012/0166421, the entire contents of which are hereby incorporated herein by reference. Example prediction and/or root cause analysis techniques that may be used for analytical and/or other purposes are described in, for example, U.S. Pat. No. 8,140,454, the entire contents of which are hereby incorporated herein by reference.

It will be appreciated that as used herein, the terms system, subsystem, service, engine, module, programmed logic circuitry, and the like may be implemented as any suitable combination of software, hardware, firmware, and/or the like. It also will be appreciated that the storage locations herein may be any suitable combination of disk drive devices, memory locations, solid state drives, CD-ROMs, DVDs, tape backups, storage area network (SAN) systems, and/or any other appropriate tangible non-transitory computer readable storage medium. Cloud and/or distributed storage (e.g., using file sharing means), for instance, also may be used in certain example embodiments. It also will be appreciated that the techniques described herein may be accomplished by having at least one processor execute instructions that may be tangibly stored on a non-transitory computer readable storage medium.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

APPENDIX

Example Configuration XML File

```
<Events_Configuration>
  <Event_Emitter>
    <Emitter_Enpoint>
      {protocol}:\\{host}:{port}\{namespace}
    </Emitter_Endpoint>
    ...
    <Filter>
      <ObjectType>
        <Types>
          <Type>All</Type>
        </Types>
        ...
        <EventTypes>
          <EventType>PendingApproval</EventType>
          <EventType>Approved</EventType>
          <EventType>MessageAlert</EventType>
          <EventType>Trigger</EventType>
          ...
        </EventTypes>
        ...
      </ObjectType>
      ...
      <ObjectType>
        <Types>
          <Type>WebService</Type>
          <Type>BusinessProcess</Type>
        </Types>
        ...
        <EventTypes>
          <EventType>PendingApproval</EventType>
          <EventType>Approved</EventType>
          <EventType>PreCreate</EventType>
          ...
        </EventTypes>
      </ObjectType>
      ...
    </Filter>
  </EventEmitter>
  <EventSubscriber>
    <Subscribe>
      <EndPoint>{protocol}:\\{host1}:{portA}\{namespace}
      </Endpoint>
      <EndPoint>{protocol}:\\{host2}:{portB}\{namespace}
      </Endpoint>
      ...
      <Filter>
        <ObjectType>
          <Types>
            <Type>All</Type>
          </Types>
          ...
          <EventTypes>
            <EventType>PendingApproval</EventType>
            <EventType>Approved</EventType>
            <EventType>MessageAlert</EventType>
            ...
          </EventTypes>
          ...
        </ObjectType>
        ...
        <ObjectType>
          <Types>
            <Type>WebService</Type>
            <Type>BusinessProcess</Type>
          </Types>
          ...
          <EventTypes>
            <EventType>PendingApproval</EventType>
            <EventType>Approved</EventType>
            <EventType>PreCreate</EventType>
            ...
          </EventTypes>
        </ObjectType>
        ...
      </Filter>
    </Subscribe>
    <Subscribe>
      <EndPoint>{protocol}:\\{host}:{port}\{namespace}</Endpoint>
      ...
    </Subscribe>
    ...
  </EventSubscriber>
</Events_Configuration>
```

What is claimed is:

1. A joint service oriented architecture (SOA) and business process governance computer system, comprising:
a computer readable storage medium configured to:
store a predefined computer-modeled business process, and
store metadata for a plurality of SOA entities that are separate from, but associated with, the predefined computer-modeled business process;
a processing system that includes at least one hardware processor coupled to the computer readable storage medium, the processing system configured to:
execute business process engine (BPE) computer instructions that coordinate execution of the predefined computer-modeled business process;
manage a SOA registry that is configured to run a governance process to enforce governance on at least the SOA entities that are associated with the predefined computer-modeled business process, wherein (1) execution of the BPE and the predefined computer-modeled business process is outside and separate from management of the SOA registry and the governance process run therein and (2) the SOA registry and the governance process run therein are outside execution of the BPE and the predefined computer-modeled business process;
execute a computer process that is configured to:
(a) receive a document that includes the predefined computer-modeled business process,
(b) extract, from the document, at least one process element of the predefined computer-modeled business process, and
(c) responsive to extraction of the process element from the document, create at least one governance object and publish the at least one governance object to the SOA registry to be included as at least part of the governance process that is executed within the SOA registry;
publish, by using an SOA event emitter that is part of the SOA registry, SOA messages that are based on execution of the governance process within the SOA registry;
subscribe to and receive, within the BPE, at least one of the published SOA messages;
publish, by using a process event emitter that is part of the BPE, process messages that are based on execution of the predefined computer-modeled business process by the BPE;
subscribe to and receive, within the SOA registry, at least one of the published process messages;
automatically execute an action or step that is part of the governance process being executed within the SOA registry based on reception of the at least one of the published process messages; and
execute an analytics application module that is configured to receive and analyze published SOA messages and published process messages.

2. The joint SOA and business process governance computer system of claim 1, wherein the processing system is further configured to: execute a complex event processing (CEP) engine that is configured to receive and analyze SOA events published by the SOA event emitter, as well as process events published by the process event emitter.

3. The joint SOA and business process governance computer system of claim 2, wherein the analytics application module and/or the CEP engine is/are configured to generate, and publish, further events based on received events, the generated events including further SOA events or further business process events and the received events including SOA events published by the SOA event emitter or process events published by the process event emitter.

4. The joint SOA and business process governance computer system of claim 1, wherein the computer process is included in the SOA registry.

5. The joint SOA and business process governance computer system of claim 1, wherein the predefined computer-modeled business process is a Business Process Model and Notation (BPMN) model.

6. The joint SOA and business process governance computer system of claim 5, wherein the BPMN model includes policy, lifecycle management, and/or approval management type governance process elements.

7. The joint SOA and business process governance computer system of claim 1, wherein the at least one process element includes at least one policy type governance process element, at least one lifecycle management type governance process element, and at least one approval management type governance process element,
  wherein the at least one governance object that is created in response to extraction of the policy type governance process element is a policy entity,
  wherein the at least one governance object that is created in response to extraction of the lifecycle management type governance process element is a lifecycle management entity, and
  wherein the at least one governance object that is created in response to extraction of the approval management type governance process element is an approval management entity.

8. The joint SOA and business process governance computer system of claim 7, wherein:
  lifecycle management entities are generatable in the SOA registry as lifecycle object, lifecycle state, and/or lifecycle stage type entities, and
  approval management entities are generatable in the SOA registry as approval work flow and/or policy type entities.

9. The joint SOA and business process governance computer system of claim 5, wherein the computer process is further configured to convert the extracted governance-related entities to WL-based representations and provide the converted representations to the SOA registry.

10. The joint SOA and business process governance computer system of claim 9, wherein the XML-based representations include XPDL elements.

11. The joint SOA and business process governance computer system of claim 9, wherein the computer process is further configured to validate at least some of the BPMN model using the XML-based representations.

12. A computer system configured to help provide combined service oriented architecture (SOA) and business process governance, the system comprising:
  a computer readable electronic storage medium configured to store a predefined modeled business process definition;
  hardware processing resources that include at least one hardware processor coupled to the computer readable electronic storage medium, the hardware processing resources configured to:
    execute business process engine (BPE) computer instructions that coordinate execution of a business process within the BPE that corresponds to the predefined modeled business process definition,
    receiving a document specifying the predefined modeled business process definition that includes at least one governance process element that is used to enforce governance on SOA entities stored in a SOA registry or the business process that leverages the SOA entities, the at least one governance process element object being a policy, lifecycle management, or approval management type governance process element,
    extract, from the document, the at least one governance process element,
    based on extraction of the at least one governance process element from the document, create at least one SOA governance object,
    deploy the at least one SOA governance object to the SOA registry to be included as at least part of a governance process that is executed within the SOA registry, wherein (1) execution of the BPE and the business process within the BPE is outside and separate from management of the SOA registry and the governance process executed within the SOA registry and (2) the SOA registry and the governance process executed therein are outside execution of the BPE and the business process within the BPE,
    publish, by using a process event emitter that is part of the BPE, process messages that are based on how the business process is run within the BPE,
    subscribe to and receive, within the SOA registry, at least one of the published process messages, and
    trigger an action or step that is part of the governance process being executed within the SOA registry based on reception of the at least one of the published process messages.

13. The system of claim 12, wherein the hardware processing resources are further configured to execute a web service that is configured to at least receive the document and extract the at least one governance process element.

14. The system of claim 12,
  wherein the at least one process governance element includes at least one policy type governance process element, at least one lifecycle management type governance process element, and at least one approval management type governance process element,
  wherein the at least one SOA governance object that is created based on extraction of the policy type governance process element is a policy entity,
  wherein the at least one SOA governance object that is created based on extraction of the lifecycle management type governance process element is a lifecycle management entity, and
  wherein the at least one SOA governance object that is created based on extraction of the approval management type governance process element is an approval management.

15. The system of claim 14, wherein:
lifecycle management entities are generated as lifecycle object, lifecycle state, and/or lifecycle stage type entities, and
approval management entities are generated as approval work flow and/or policy type entities.

16. The system of claim 12, wherein the document includes a Business Process Model and Notation (BPMN) model that represents at least some of the business process run within the BPE.

17. The system of claim 16, wherein the hardware processing resources are further configured to convert the document to an XML-based representation of the BPMN model.

18. The system of claim 17, wherein the hardware processing resources are further configured to validate at least some of the BPMN model using the XML-based representation.

19. A service oriented architecture (SOA) system, comprising:
computer readable electronic storage configured to store:
a predefined modeled business process definition;
store metadata for a plurality of SOA entities that are separate from, but associated with, the predefined computer-modeled business process definition;
at least one hardware processor coupled to the computer readable electronic storage, the at least one hardware processor configured to:
execute business process engine (BPE) computer instructions that coordinate execution of the predefined modeled business process definition;
manage a SOA registry that is configured to run a governance process to enforce governance on at least the SOA entities that are associated with the predefined computer-modeled business process executable by a business process engine (BPE), wherein (1) execution of the BPE and the predefined modeled business process is outside and separate from management of the SOA registry and the governance process run therein and (2) the SOA registry and the governance process run therein are outside execution of the BPE and the predefined modeled business process;
execute a computer process that is configured to:
(a) receive a document that includes the predefined computer-modeled business process definition,
b) extract, from the document, at least one process element of the predefined computer-modeled business process definition, and
(c) responsive to extraction of the process element from the document, create at least one governance object and publish the at least one governance object to the SOA registry to be included as at least part of the governance process that is run within the SOA registry;
publish, by using an event-driven architecture (EDA) based SOA event emitter, SOA messages that are based on how the SOA registry has run the governance process within the SOA registry;
receive, via a process event subscriber, at least one process message that has been published by a process event emitter that is part of the BPE; and
trigger an action or step that is part of the governance process being run within the SOA registry based on reception of the at least one of the process messages, the action or step enforcing governance by using enabled ones of the at least one governance object.

20. The system of claim 19, further comprising:
a first connection to an analytics application over which subscribed to first events are receivable, the first events including at least one of SOA events and process events; and
a second connection to a complex event processing (CEP) engine over which subscribed to second events are receivable, the second events including at least one of SOA events and process events.

21. A method of providing combined service oriented architecture (SOA) and business process governance on a computer system that includes at least one hardware processor and electronic storage that is electronically accessible by the one hardware processor, the electronic storage storing a Business Process Model and Notation (BPMN) model file, the method comprising:
providing, by using the at least one hardware processor, a SOA registry that is configured to run a governance process to enforce governance on SOA entities that are associated with the BPMN model in the file;
receiving, via a computer service that is being executed by at least one hardware processor, the Business Process Model and Notation (BPMN) model file that specifies at least one governance-related process element to be enforced on (a) Service Oriented Architecture (SOA) entities stored in a SOA registry and/or (b) a business process leveraging the SOA entities that is run within a business process engine (BPE), wherein (1) execution of the BPE and the business process of the BPMN model file by the BPE is outside and separate from the SOA registry and the governance process run therein and (2) the SOA registry and the governance process run therein are outside execution of the BPE and the business process run within the BPE;
automatically extracting the at least one governance-related process element from the BPMN model file;
responsive to extraction of the at least one governance-related process element, creating at least one governance object based on the extracted at least one governance-related process element;
responsive to the creation of the at least one governance object, validating each said created at least one governance object;
publishing, in connection with at least one hardware processor, each said validated governance object to the SOA registry;
activating, within the SOA registry, the at least one published governance object;
publishing, by using an SOA event emitter that is part of the provided SOA registry, SOA messages that are based on running of the governance process by the SOA registry;
receiving, within the SOA registry, process messages that have been published based on execution of the business process by the BPE;
triggering an action or step that is part of the governance process being run within the SOA registry based on reception of the at least one of the published process messages, wherein the action or step is related to policy, lifecycle management, and/or approval management type governance tasks of the governance process.

22. The method of claim 21, wherein the SOA event emitter is an event-driven architecture (EDA) based SOA event emitter.

23. A non-transitory computer readable storage medium tangibly storing instructions for use with a computer system that includes at least one hardware processor and electronic storage that is accessible by the at least one hardware processor, the electronic storage storing a Business Process Model and Notation (BPMN) model and metadata for a plurality of Service Oriented Architecture (SOA) entities that are separate from, but associated with, a business process of the BPMN model, the computer system managing a SOA registry that is configured to run a governance process to enforce governance on the SOA entities that are associated with the Business Process Model and Notation (BPMN) model, the instructions comprising instructions that cause the computer system to:

receive, via a computer service that is being executed by at least one hardware processor, a model file that includes the Business Process Model and Notation (BPMN) model that specifies at least one governance-related process element to be enforced on (a) the (SOA) entities and/or (b) the business process leveraging the SOA entities that is run within a business process engine (BPE), wherein (1) execution of the BPE and the business process run within the BPE is outside and separate from the computer systems management of SOA registry and the governance process run therein and (2) the SOA registry and the governance process run therein are outside execution of the BPE and the business process run within the BPE;

automatically extract the at least one governance-related process element from the BPMN model file;

responsive to extraction of the at least one governance-related process element, create at least one governance object based on the extracted at least one governance-related process element;

validate each said created at least one governance object;

publish, in connection with at least one hardware processor, each said validated governance object to the SOA registry;

activate, within the SOA registry, the at least one published governance object;

publish, by using an SOA event emitter that is part of the provided SOA registry, SOA messages that are based on running of the governance process by the SOA registry;

receive, within the SOA registry, process messages that have been published based on execution of the business process by the BPE;

trigger an action or step that is part of the governance process being run within the SOA registry based on reception of the at least one of the published process messages, wherein the action or step is related to policy, lifecycle management, and/or approval management type governance tasks of the governance process.

24. The non-transitory computer readable storage medium of claim 22, wherein the SOA event emitter is an event-driven architecture (EDA) based SOA event emitter.

25. The joint SOA and business process governance computer system of claim 1, wherein the processing system is further configured to:

in accordance with execution of the governance process within the SOA registry that includes the triggered action, publish a first SOA message of the SOA messages; and receive, in the BPE, the first SOA message and continue execution of the predefined computer-modeled business process by the BPE based on contents of the first SOA message.

26. The joint SOA and business process governance computer system of claim 25, wherein the contents of the published first SOA message are based on the execution of the governance process within the SOA registry.

\* \* \* \* \*